(12) United States Patent
Sawada et al.

(10) Patent No.: US 7,844,267 B2
(45) Date of Patent: Nov. 30, 2010

(54) SERVER FOR PROVIDING ACCESS BY A COMMUNICATION TERMINAL TO A COMMUNICATION PROCESSING SERVICE

(75) Inventors: Hisanori Sawada, Sendai (JP); Ayumi Eguchi, Fukuoka (JP); Junko Izawa, Setagaya-ku (JP); Takeshi Ichikawa, Kita-ku (JP); Tomonori Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 712 days.

(21) Appl. No.: 11/576,846

(22) PCT Filed: Oct. 5, 2005

(86) PCT No.: PCT/JP2005/018458

§ 371 (c)(1),
(2), (4) Date: Sep. 26, 2007

(87) PCT Pub. No.: WO2006/038658

PCT Pub. Date: Apr. 13, 2006

(65) Prior Publication Data

US 2008/0287128 A1   Nov. 20, 2008

(30) Foreign Application Priority Data

Oct. 7, 2004  (JP) ............................. 2004-295322

(51) Int. Cl.
*H04W 4/00* (2009.01)
(52) U.S. Cl. .................... 455/435.1; 455/410; 455/411; 713/183; 713/171; 713/168; 713/160; 713/185; 380/249
(58) Field of Classification Search ........... 455/411, 455/410, 435.1, 414.1; 713/183, 171, 168, 713/155, 160, 185; 380/259, 249
See application file for complete search history.

(56) References Cited

U.S. PATENT DOCUMENTS

| | | | |
|---|---|---|---|
| 6,836,765 B1 * | 12/2004 | Sussman | 705/75 |
| 7,310,307 B1 * | 12/2007 | Das et al. | 370/229 |
| 7,499,888 B1 * | 3/2009 | Tu et al. | 705/44 |
| 2004/0185837 A1 * | 9/2004 | Kim et al. | 455/414.3 |

FOREIGN PATENT DOCUMENTS

EP   1 422 950 A1   5/2004

(Continued)

*Primary Examiner*—Charles N Appiah
*Assistant Examiner*—Kwasi Karikari
(74) *Attorney, Agent, or Firm*—Oblon, Spivak, McClelland, Maier & Neustadt, L.L.P.

(57) ABSTRACT

A service processing server for providing a communication processing service with an information providing server, to a cell phone belonging to a network capable of identifying subordinate cell phones, and including an application receiving part for receiving first communication terminal-specific information to specify a specific cell phone, and service-specific information in association with each other; a specific information generating part for generating second communication terminal-specific information; an approval requesting part for transmitting approval request information containing the service-specific information and the second communication terminal-specific information, to the information providing server; a result receiving part for receiving approval result information returned; and a registering part for performing a registration process for providing the communication processing service to the specific cell phone in accordance with reception of the approval result information.

12 Claims, 5 Drawing Sheets

FOREIGN PATENT DOCUMENTS

| | | |
|---|---|---|
| JP | 5 63696 | 3/1993 |
| JP | 11 212462 | 8/1999 |
| JP | 2001-209611 | 8/2001 |
| JP | 2001 350724 | 12/2001 |
| JP | 2002 135334 | 5/2002 |
| JP | 2002 207919 | 7/2002 |
| JP | 2004-220325 | 8/2004 |
| TW | 540245 | 7/2003 |

* cited by examiner

SERVER FOR PROVIDING ACCESS BY A COMMUNICATION TERMINAL TO A COMMUNICATION PROCESSING SERVICE

TECHNICAL FIELD

The present invention relates to a server capable of providing a communication processing service to a communication terminal belonging to a network capable of identifying equipment bodies of respective subordinate communication terminals.

BACKGROUND ART

In mobile communication networks and Internet networks, the following service is conventionally available: a third party (service agent) carries out provision of a service, e.g., issue of a coupon, provision of useful information, etc. to users, on behalf of a subject (business entity desiring to provide the service) (e.g., reference is made to Patent Document 1 below).

Patent Document 1: Japanese Patent Application Laid-Open No. 2002-207919

DISCLOSURE OF THE INVENTION

Problem to be Solved by the Invention

There is a scheme similar to the above, in which the service agent provides a link function for a user to access a site of the foregoing business entity. A type of the provision of the link function is one wherein the service agent provides the service of the link function to sites of a plurality of business entities and wherein a user selects only the service of the link function to a site which the user desires to access, out of the plurality of sites, and receives the service.

In this case, it is usually necessary to effect a service registration according to the service as described below, prior to the provision of the service. First, the user preliminarily registers a user-specific code with the service agent and, when the user wants to receive a service, the user notifies a business entity corresponding to the service, of its code to apply for provision of the service. The business entity, receiving the information of the application, transfers the application information containing the user-specific code to the service agent. The service agent, receiving the application information, performs authentication of the user by the code contained in the information, and completes the service registration to make the service available for the user. This service registration enables the user to start using the service. The user-specific code is used on the occasion of the service registration herein, in order to prevent the business entity from effecting registration without user's permission. The user applies for the use of the service, not to the service agent, but to the business entity, for allowing the business entity to determine whether the service is to be provided to the user.

As described above, the user is required to notify the business entity of the user-specific code on the occasion of applying to the business entity for the provision of the service. It is, however, cumbersome for the user to have to notify the business entity of the code, and when the user does not remember the code, the service agent cannot complete the registration for making the service available for the user in that case.

An object of the present invention is therefore to provide a server enabling easier service registration.

Means for Solving the Problem

A server according to the present invention is a first server capable of providing a communication processing service with a second server, to a communication terminal belonging to a network capable of identifying equipment bodies of respective subordinate communication terminals, the first server comprising: application receiving means for receiving first communication terminal-specific information to specify a specific communication terminal having acquired service-specific information specifying the communication processing service, and the acquired service-specific information in association with each other; specific information generating means for generating second communication terminal-specific information for letting the second server recognize the specific communication terminal, based on the received first communication terminal-specific information; approval requesting means for generating approval request information containing the service-specific information and the second communication terminal-specific information and for transmitting the approval request information to the second server; result receiving means for receiving approval result information containing the service-specific information and the second communication terminal-specific information, returned from the second server in accordance with transmission of the approval request information; and registering means for determining that reception of the communication processing service by the specific communication terminal was approved, according to reception of the approval result information, and for providing the communication processing service to the specific communication terminal.

The (first) server of the present invention is arranged to acquire the specific information of the communication terminal belonging to the network and to perform the service registration for the communication terminal, using the communication terminal-specific information. Therefore, the user can effect easy service registration, without need for transmission of such information as a code for authentication of the communication terminal.

Effect of the Invention

The present invention enables easy service registration, without need for a user to transmit such information as a code for authentication of a communication terminal.

DESCRIPTION OF REFERENCE SYMBOLS 10 service processing server; 101 application receiving part; 102 authentication processing part; 103 specific information generating part; 104 approval requesting part; 105 result receiving part; 106 registering part; 107 service processing part; 210 user information storage part; 20 cell phone; 35, 36 information providing servers; N1 network (mobile communication network); N2 network.

BEST MODE FOR CARRYING OUT THE INVENTION

The expertise of the present invention can be readily understood in view of the following detailed description with reference to the accompanying drawings presented by way of illustration only. Subsequently, an embodiment of the present invention will be described with reference to the accompanying drawings. The same portions will be denoted by the same reference symbols as much as possible, without redundant description.

Figure 1:
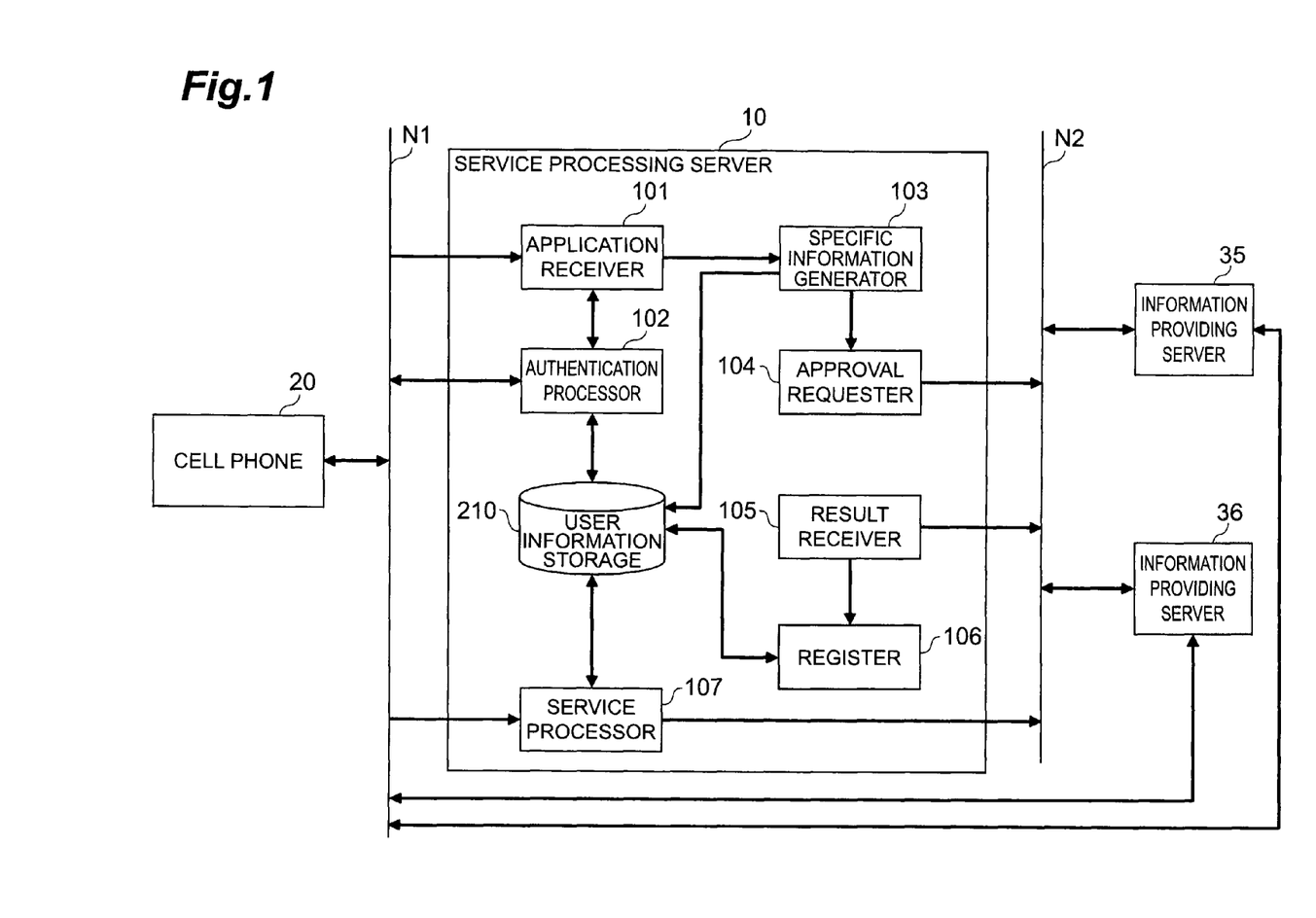
FIG. 1 is a drawing showing a configuration of a service processing server according to an embodiment.

FIG. 1 shows a configuration of a service providing system constructed including a service processing server 10 (first server) of the present embodiment and another service processing server 10. The service processing server 10 is able to transmit and receive information to and from cell phone 20 (communication terminal) through network N1. The service processing server 10 is also able to transmit and receive information to and from information providing servers 35, 36 (second servers) through network N2.

The service processing server 10 is a server that provides a communication processing service with the information providing servers 35, 36, to cell phone 20 undergoing service registration. The communication processing service with the information providing servers 35, 36 corresponds, for example, to provision of a link function for cell phone 20 to access the information providing server 35 or 36, or the like. Specifically, the service processing server 10 is preferably implemented by an information processing device comprised of a CPU, a memory, and so on. Each of functions of the service processing server 10 will be described later.

Each information providing server 35, 36 is a server with that the service processing server 10 provides the communication processing service, that is accessed through the network N1 by cell phone 20, and that provides various information. The information providing server 35, 36 performs approval of service registration for cell phone 20 carried out by the service processing server 10. Specifically, the information providing server 35, 36 is preferably implemented by an information processing device comprised of a CPU, a memory, and so on. Specifically, the foregoing information provision is carried out, for example, by a variety of business entities mainly consisting of business entities targeting general customers, such as retail stores, rental shops, and banks. Therefore, the information providing servers 35, 36 shown in FIG. 1 refer to servers for information provision by different business entities, and three or more servers may exist. Since information providing servers 35, 36 of plural business entities may exist as described above, management of the service processing server 10 is preferably carried out by the aforementioned service agent. The configuration and operation of the service providing system will be described below based on the information providing server 35 only.

A cell phone 20 is a terminal that receives a communication processing service with the information providing server 35 from the service processing server 10. The cell phone 20 receives information provided from the information providing server 35 through the communication processing service with the information providing server 35. The cell phone 20 has a mobile communication function and owns a phone number for identifying each equipment body in the mobile communication network. The cell phone 20 is preferably further provided with a Web access function. There are normally a plurality of cell phones 20, but an example of only one cell phone will be described for simplification of description.

The network N1 is an object to which the service processing server 10, cell phone 20, and information providing server 35 connect, and, specifically, is preferably a mobile communication network. Here the service processing server 10 is under substantial management of the network N1 and is able to receive a phone number (first communication terminal identification information) to identify an equipment body of each subordinate cell phone 20 under the network N1. The network N2 is an object to which the service processing server 10 and the information providing server 35 connect, and, specifically, is preferably an Internet network, or a circuit by a dedicated line.

Subsequently, each of functions of the service processing server 10 will be described. As shown in FIG. 1, the service processing server 10 is composed of application receiving part 101 (application receiving means), authentication processing part 102 (authentication processing means), specific information generating part 103 (specific information generating means), approval requesting part 104 (approval requesting means), result receiving part 105 (result receiving means), registering part 106 (registering means), service processing part 107, and user information storage part 210.

The application receiving part 101 is a part that receives the phone number of cell phone 20 and service-specific information in association with each other. The service-specific information is information for specifying the communication processing service provided by the service processing server 10 and, specifically, it is preferable to use an ID consisting of a number of ten and several digits. The service-specific information is preferably received as information transmitted from the cell phone 20, and the phone number of cell phone 20 is preferably received as information added to the transmitted information by the network N1. The received information is sent to the specific information generating part 103. The service-specific information is preferably transmitted while information such as a URL (Uniform Resource Locator) indicating an access address of the information providing server 35 is added thereto.

The authentication processing part 102 is a part that reads out authentication information corresponding to the cell phone 20, stored in the user information storage part 210, and that performs authentication of a user of the cell phone 20, based on the authentication information transmitted from the cell phone 20. Specifically, the authentication information is preferably a password consisting of a number of four digits. The authentication information is preferably information that the user of cell phone 20 normally remembers, like a password for connection of the cell phone 20 to the network N1.

The specific information generating part 103 is a part that generates an application ID (second communication terminal-specific information), based on the received phone number. The application ID is information for letting the information providing server 35 recognize the cell phone 20 as a target for service registration. Specifically, the application ID to be used is preferably an ID consisting of a number of ten and several digits. The service processing server 10 is preferably arranged to hold correspondence information between the phone number and the application ID. The reason why the application ID is generated is that it prevents the business entity from knowing the phone number of the user. The generated application ID, and the service-specific information received by the application receiving part 101 are sent to the approval requesting part 104. The application ID and the service-specific information are stored corresponding to the phone number in the user information storage part 210. In addition to the method of holding the application ID and the phone number corresponding to each other, another applicable method is to store a logic enabling unique transformation from the application ID to the phone number, in the service processing server 10. The number of application IDs generated based on one phone number is not limited to one but may be two or more. In another configuration, the specific information generating part 103 may be arranged, for example, to preliminarily create application IDs corresponding to phone numbers of cell phones 20 pre-registered and to use the application IDs on the occasion of registration.

The approval requesting part 104 is a part that generates approval request information containing the service-specific information and the application ID and transmits the approval request information to the information providing server 35. The approval requesting part 104 is preferably arranged to encrypt the information containing the service-specific information and the application ID and to make the approval request information further contain the encrypted information. This encrypted information is used for the registering part 106 to check the registration information more reliably, i.e., to transmit and receive information safely. Specifically, the encrypted information is preferably generated as follows: a hash function (one-way function) is preliminarily stored in the approval requesting part 104, and the encrypted information is defined as a value of output obtained when an input to the hash function is the information containing the service-specific information and the application ID.

The encrypted information is preferably information encrypted while containing private information except for the service-specific information and the application ID, i.e., information not transmitted to the information providing server 35. Such information preferably used is, for example, information specific to the cell phone 20 (e.g., information of a date and time when the cell phone 20 was pre-registered, or the like), which is held in the user information storage part 210. The information not transmitted to the information providing server 35 is contained in the encrypted information for the purpose of enabling safer transmission/reception of information by inclusion of information unknowable for the information providing server 35 in the generation of the encrypted information.

Supposing that the encrypted information was generated as described above, the encrypted information will be unique information once the cell phone 20 and the service of the service registration are determined. In order to avoid the encrypted information from becoming unique and to enable much safer transmission/reception of information, the encrypted information is preferably information encrypted while containing information not overlapping with respect to the application ID in each encryption process. Specifically, such information not overlapping is preferably information of a time when the application receiving part 101 receives the information. When encryption is performed with the information not overlapping in this manner, the encrypted information is nonunique, different from that as described above, and enables much safer transmission/reception of information. When the information of time is contained in the encrypted information, it becomes feasible to make a judgment on the propriety of registration or the like, based on a time from transmission of the approval request information to the information providing server 35 to reception of approval result information.

The result receiving part 105 is a part that receives the approval result information returned from the information providing server 35 in accordance with the transmission of the approval request information. The approval result information contains the service-specific information and the application ID. In addition, the approval result information preferably further contains the aforementioned encrypted information as well. When the approval result information contains the encrypted information, it becomes feasible to examine the validity of the returned service-specific information or the like (whether the data was illegally altered by the information providing server 35, or the like), based on the encrypted information. The received information is sent to the registering part 106.

The registering part 106 is a part that determines that reception of the communication processing service corresponding to the application of the cell phone 20 submitting the application was approved, according to the reception of the approval result information, and that performs a registration process for providing the communication processing service to the cell phone 20. It is preferable to check the approval result information by the encrypted information on the occasion of the registration.

The service processing part 107 is a part that provides the communication processing service to the cell phone 20 under the service registration when the cell phone 20 requests provision of the communication processing service. Whether the cell phone 20 is under the service registration is determined with reference to the information of service registration stored in the user information storage part 210. The communication processing service is provided, specifically, by transmitting link information to the information providing server corresponding to the communication processing service, or the like.

The user information storage part 210 is a part that stores information about each user of cell phone 20 associated with the service registration. Specifically, the information stored includes authentication information corresponding to the cell phone 20, used in the authentication processing part 102, the service registration information registered by the registering part 106, and so on.

Figure 2:
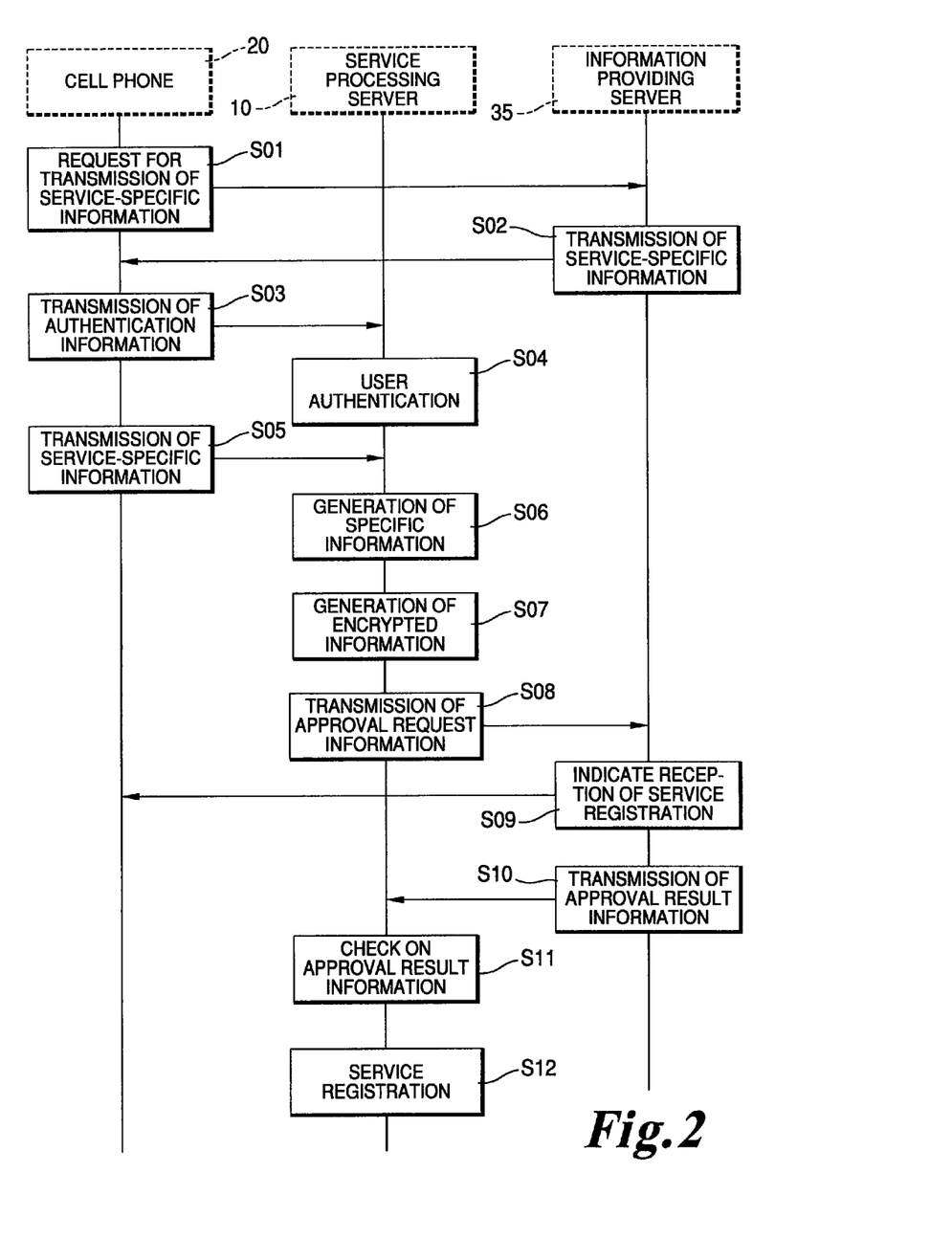
FIG. 2 is a sequence diagram showing processing executed in a system including the service processing server in the embodiment.

A processing operation executed by the service providing system in the present embodiment will be described below with reference to the sequence diagram of FIG. 2. This processing operation is carried out when the user of cell phone 20 performs the service registration for reception of the communication processing service with the information providing server 35 provided by the service processing server 10.

First, the cell phone 20 requests the information providing server 35 to transmit service-specific information (S01). Specifically, this request is preferably carried out by the cell phone 20's making Web access to a specific URL of the information providing server 35. This access corresponds to the request for acquisition of the service-specific information to the information providing server 35.

The information providing server 35, receiving the request for acquisition of the service-specific information, transmits the service-specific information to the cell phone 20 (S02). The cell phone 20 receives the information.

Figure 3:
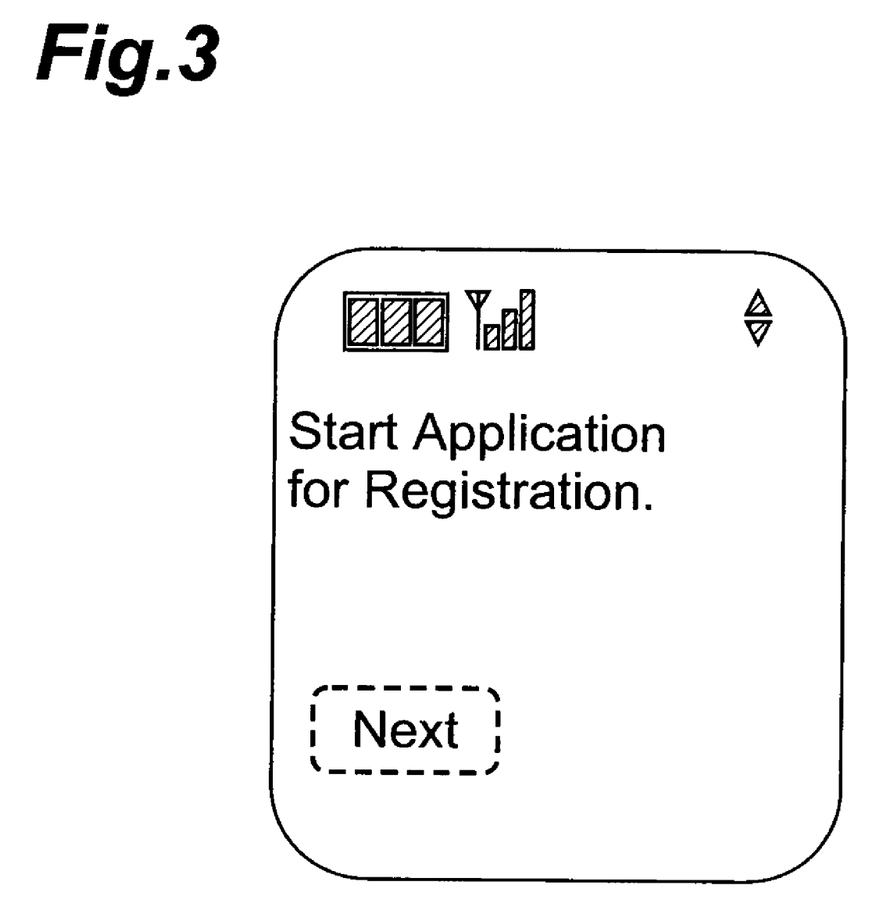
FIG. 3 is an example of a screen displayed on a display device of a cell phone when the cell phone in FIG. 1 requests a start of service registration.
Figure 4:
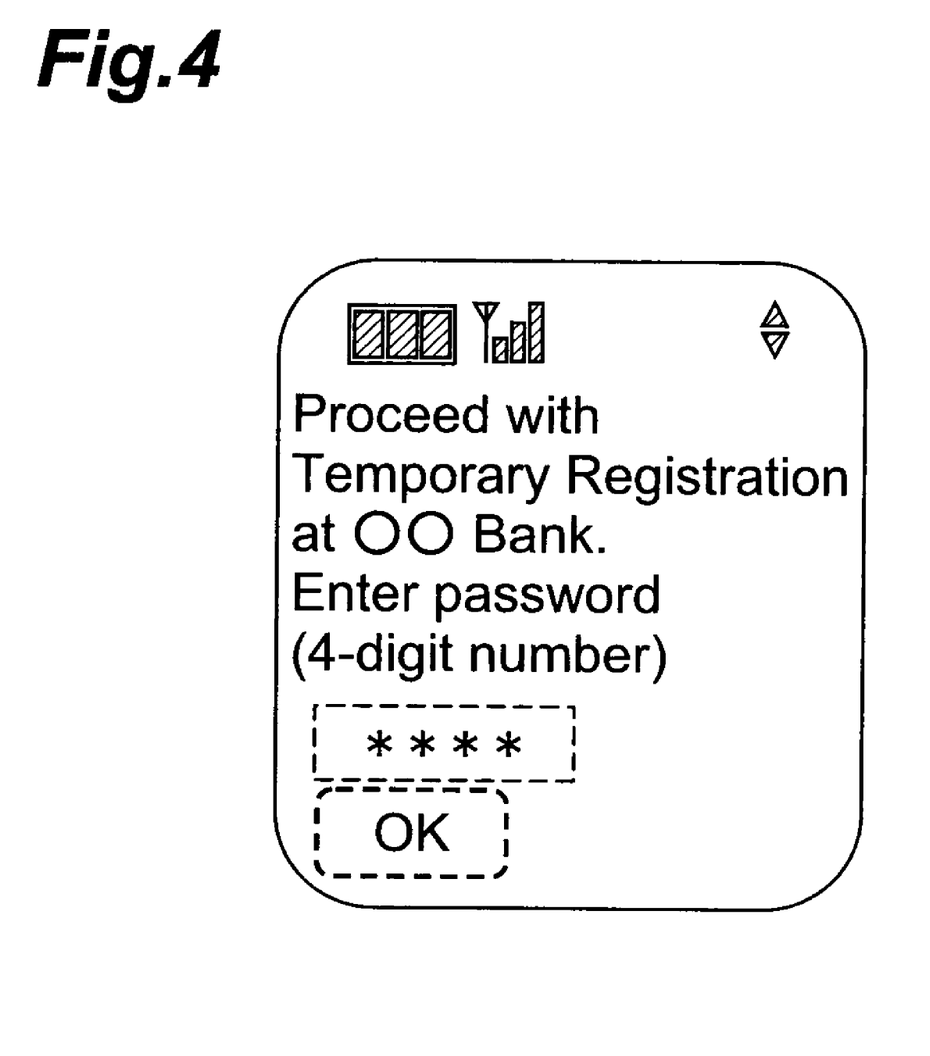
FIG. 4 is an example of a screen displayed on the display device of the cell phone when the cell phone in FIG. 1 transmits authentication information to the service processing server.

Subsequently, the cell phone 20 transmits authentication information to the service processing server 10 (S03). Specifically, this transmission is preferably carried out as follows. First, screen data is transmitted along with the information transmitted in S02, from the information providing server 35, and the cell phone 20 displays the screen as shown in FIG. 3, on its display device, based on the screen data. Subsequently, the user manipulates the cell phone to click the "Next" button in the screen shown in FIG. 3. In a preferred configuration, the button is equipped with a link function for access to the service processing server 10, the screen as shown in FIG. 4 comes to be displayed on the display device of cell phone 20 by access to the service processing server 10 through the link function, and in the screen, the user enters private information (password) and clicks the "OK" button.

In the service processing server 10, the authentication processing part 102 then performs authentication of the user of cell phone 20, based on the private number transmitted (S04). Subsequent processing is carried out only when the user authentication is successfully completed.

Subsequently, the cell phone 20 transmits the service-specific information acquired in S02, to the service processing server 10 (S05). Specifically, the cell phone 20 preferably transmits the service-specific information acquired in S02, to the service processing server 10, subsequent to the transmission of the authentication information with a click on the "OK" button in S03. In the service processing server 10 to which the service-specific information was transmitted, the application receiving part 101 receives the information. At this time, the application receiving part 101 also receives the information of the phone number of the cell phone 20 added to the foregoing information by the network N1. The received information is sent to the specific information generating part 103. This information provides the service processing server 10 with information about which cell phone 20 applies for service registration for which service.

Subsequently, the specific information generating part 103 generates an application ID for letting the information providing server 35 recognize the cell phone 20 applying for the service registration, based on the phone number of the cell phone 20 (S06). The generated application ID and the service-specific information are transmitted to the approval requesting part 104 and stored in the user information storage part 210. In another configuration, as described above, in addition to the foregoing storage of the application ID, the service processing server 10 may be arranged to store a logic permitting unique transformation from the application ID to the phone number and to allow reference to the phone number corresponding to the application ID by use of the logic.

Subsequently, the approval requesting part 104 generates encrypted information (S07). The encrypted information is preferably information encrypted while containing the service-specific information, application ID, information specific to the cell phone 20, and information of the time of reception of the information by the application receiving part 101 (reception date and time information), as described above. The encrypted information is generated herein by the method of generating the information using the aforementioned hash function, and it enables the same encrypted information to be generated from the original information, whereby there is no need for storage of the information in the service processing server 10, which imposes no load on a storage device such as a hard disk due to storage of the encrypted information.

Figure 5:
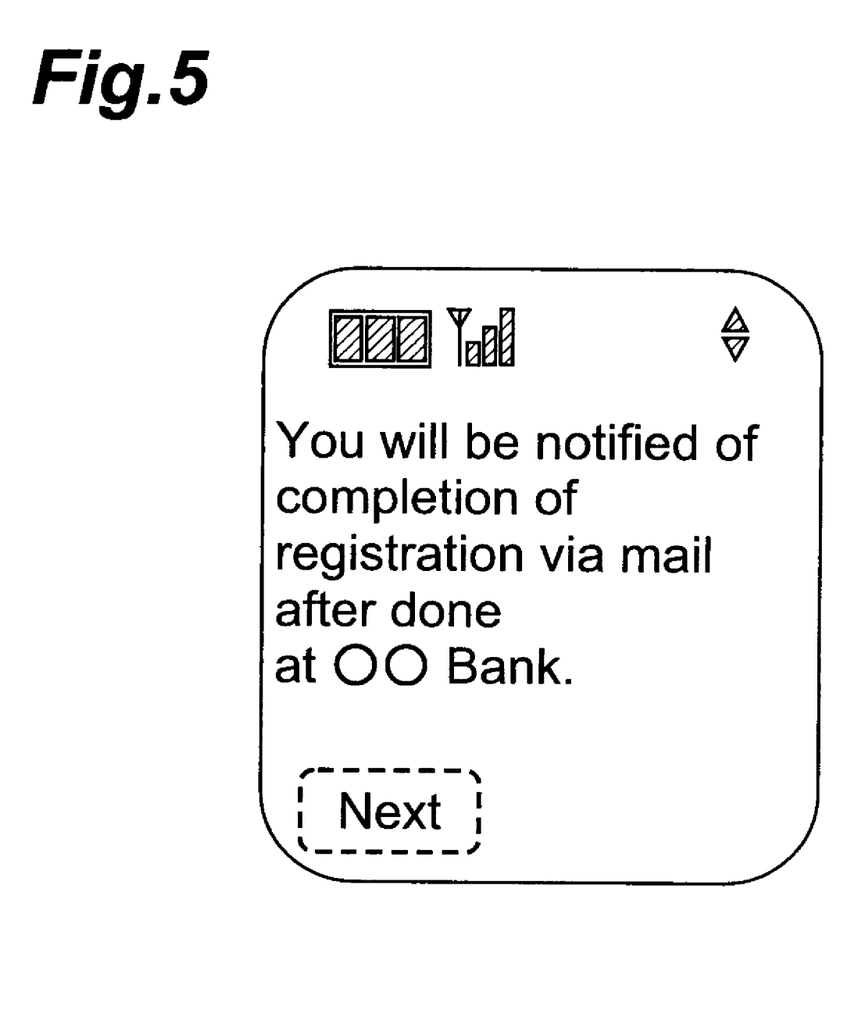
FIG. 5 is an example of a screen displayed on the display device of the cell phone when the service processing server in FIG. 1 notifies the cell phone of acceptance of registration.

Subsequently, the approval requesting part 104 transmits to the information providing server 35 the approval request information containing the application ID, service-specific information, reception date and time information, and encrypted information (S08). The recipient upon the transmission herein (information providing server 35) is preferably specified by the aforementioned information such as the URL attached to the service-specific information. Alternatively, the recipient may also be specified as follows: the service processing server 10 is arranged to preliminarily hold correspondence information between the service-specific information and information to specify the recipient, and to determine the recipient, based on the information. The information providing server 35, to which the information was transmitted, receives the information. This information permits the information providing server 35 to specify the service and the cell phone 20 to undergo the service registration. After the information providing server 35 specifies the cell phone 20, the approval requesting part 104 receives a response from the information providing server 35 and transmits a screen indicating reception of the service registration to the cell phone 20 (S09, FIG. 5).

Next, the information providing server 35 transmits to the service processing server 10 the approval result information containing the received application ID, service-specific information, reception date and time information, and encrypted information (S10). This transmission means that the service registration was approved for the cell phone 20. In the service processing server 10 to which the information was transmitted, the result receiving part 105 receives the approval result information. The received information is sent to the registering part 106. The information transmitted from the information providing server 35 to the service processing server 10 may be transmitted with an ID individually given to the cell phone 20 for management thereof by the information providing server 35. The system may be so arranged that the transmission of this approval result information is performed based on a determination by the business entity managing the information providing server 35.

Subsequently, the registering part 106 checks whether the information contained in the approval request information transmitted by the approval requesting part 104 agrees with the information contained in the approval result information received by the result receiving part 105, by comparing the corresponding information items with each other (S11). The information items to be checked on agreement are the application ID and the service-specific information. The registering part 106 is also preferably arranged to perform a check using the encrypted information. If the service-specific information or the application ID were altered in the information providing server 35, an error would be detected based on the encrypted information and the alteration could be detected. The check based on the encrypted information is carried out by comparing the encrypted information contained in the approval result information received by the result receiving part 105, with the encrypted information generated by the approval requesting part 104. When the encrypted information is generated using the hash function as described above, the registering part 106 may be arranged to again generate the same encrypted information and to compare the generated encrypted information with the encrypted information contained in the approval result information received by the result receiving part 105. When disagreement is found between some pair of information items, the registering part 106 discontinues the subsequent processing. Furthermore, the result receiving part 105 may be arranged to compare the date and time indicated by the received reception date and time information, with the current date and time and to discontinue the processing, for example, if five or more days have passed since the reception date and time.

When agreement is determined between each pair of information items, the registering part 106 performs service registration according to the service specified by the service-specific information, for the cell phone 20 having submitted the application (S12). The service registration is preferably carried out by storing the information in the user information storage part 210, or the like. The service processing server may be arranged to also store the ID individually provided for the cell phone 20 by the information providing server 35. In the service processing server 10, the service processing part 107 provides the service to the cell phone 20 successfully subjected to the service registration.

As described above, the service processing server 10 according to the present embodiment enables easy service registration. Namely, since the service registration is effected without need for transmission of information of a code or the like from the cell phone 20, neither of the user of the cell phone 20 and the business entity managing the information providing server 35 has to know the information of the code or the like. Since in the present embodiment the communication terminal-specific information (phone number) to specify the cell phone 20 is acquired from the network N1, it can prevent the cell phone 20 from pretending to be another terminal.

Since the service processing server 10 (registering part 106) checks the information exchanged for the service registration between the service processing server 10 and the information providing server 35, it is feasible to prevent service registration from being effected for a cell phone 20 of another user unwilling to undergo service registration. When the approval result information is checked using the encrypted information as in the present embodiment, it becomes feasible to perform safer service registration.

When the network N1 is a mobile communication network and the phone number is used as the communication terminal-specific information as in the present embodiment, it becomes feasible to perform more reliable service registration.

When the application ID is generated as information different from the phone number as in the present embodiment, the service registration can be performed without notifying the information providing server 35 of the phone number. This method is preferably adopted, particularly, where the first communication terminal-specific information is information unsuitable for provision to third parties, such as the phone number.

When the user authentication is carried out based on the authentication information transmitted from the cell phone 20 as in the present embodiment, it becomes feasible to perform safer service registration. For example, supposing that a cell phone 20 is stolen or the like and that a third person attempts to undergo service registration, authentication will fail, so as to result in failure in registration because the private information is known by the user of cell phone 20 only. The authentication information used herein can be a private number or the like for connection of the cell phone 20 to the network N1, and there is no need for use of a code specific to the user or the like for service registration.

In the present embodiment the information providing server 35 performing the approval for the service registration does not acquire the information about the user of cell phone 20. For example, in a case where the business entity managing the information providing server 35 is, for example, a bank or the like, the business entity might desire to perform the approval for service registration on the basis of the information about the user, depending upon the content of the service. The information about the user is, for example, an age and gender.

In such cases, the information providing server 35 may be arranged to further comprise a user information receiving part (not shown, user information receiving means) for receiving the information about the user of the cell phone 20 transmitted from the cell phone 20, and to perform the service registration based on the information about the user received. For example, service registration can be permitted only when the user applying for the service registration is a female.

Preferably, the network is a mobile communication network, and the first communication terminal-specific information is a phone number of the specific communication terminal in the mobile communication network. This configuration permits use of the phone number as information to identify the equipment body of each subordinate communication terminal under the network and thus enables more reliable service registration.

Preferably, the second communication terminal-specific information is information different from the first communication terminal-specific information. This configuration enables execution of service registration without notifying the second server of the first communication terminal-specific information in such cases that disclosure of the first communication terminal-specific information to third parties is not appropriate.

Preferably, the approval request information contains encrypted information obtained by encrypting information containing at least the service-specific information and the second communication terminal-specific information, and plaintext information in a state in which the service-specific information and the second communication terminal-specific information is not encrypted, the approval result information also contains the encrypted information and the plaintext information, and the registering means encrypts the plaintext information contained in the approval result information, compares the encrypted result with the received encrypted information to determine whether the approval request information corresponds to the approval result information, and performs the registration process when the approval request information corresponds to the approval result information. This configuration prevents alteration or the like of the information in the second server and thus enables safer service registration.

Preferably, the encrypted information is information encrypted while containing private information except for the service-specific information and the second communication terminal-specific information, and the plaintext information does not contain the private information. Since this configuration makes the encrypted information contain the information not transmitted to the second server, it improves confidentiality of the encryption method and thus enables safer service registration.

Preferably, the encrypted information is information encrypted while containing information not overlapping with respect to the second communication terminal-specific information in each encryption process. This configuration prevents the generated encrypted information from overlapping with respect to the second communication terminal-specific information, and thus enables much safer service registration.

Preferably, the first server comprises information storing means for preliminarily storing authentication information corresponding to the communication terminal, and authentication processing means for performing authentication of a user of the specific communication terminal with reference to the authentication information stored in the information storing means, based on authentication information transmitted from the specific communication terminal. This configuration permits authentication of the user and thus enables safer service registration.

INDUSTRIAL APPLICABILITY

The present invention is applicable to servers for providing a communication processing service to communication terminals on a communication network, and enables easy service registration, without need for a user to transmit such information as a code for authentication of a communication terminal.

The invention claimed is:

1. A first server capable of providing a communication processing service with a second server, to a communication terminal belonging to a network capable of identifying equipment bodies of respective subordinate communication terminals, the first server comprising:
application receiving means for receiving first communication terminal-specific information to specify a specific communication terminal having acquired service-specific information specifying the communication processing service, and the acquired service-specific information in association with each other;
specific information generating means for generating second communication terminal-specific information for letting the second server recognize the specific communication terminal, based on the received first communication terminal-specific information;
approval requesting means for generating approval request information containing the service-specific information and the second communication terminal-specific information and for transmitting the approval request information to the second server;
result receiving means for receiving approval result information containing the service-specific information and the second communication terminal-specific information, returned from the second server in accordance with transmission of the approval request information; and
registering means for determining that reception of the communication processing service by the specific communication terminal was approved, according to reception of the approval result information, and for providing the communication processing service to the specific communication terminal, wherein
the approval request information contains encrypted information obtained by encrypting information containing at least the service-specific information and the second communication terminal-specific information, and plaintext information in a state in which the service-specific information and the second communication terminal-specific information is not encrypted,
the approval result information also contains the encrypted information and the plaintext information, and
the registering means encrypts the plaintext information contained in the approval result information, compares the encrypted result with the received encrypted information to determine whether the approval request information corresponds to the approval result information, and performs the registration process when the approval request information corresponds to the approval result information.

2. The first server according to claim 1, wherein the network is a mobile communication network, and the first communication terminal-specific information is a phone number of the specific communication terminal in the mobile communication network.

3. The first server according to claim 2, wherein the second communication terminal-specific information is information different from the first communication terminal-specific information.

4. The first server according to claim 1, wherein the encrypted information is information encrypted while containing private information except for the service-specific information and the second communication terminal-specific information, and the plaintext information does not contain the private information.

5. The first server according to claim 1, wherein the encrypted information is information encrypted while containing information not overlapping with respect to the second communication terminal-specific information in each encryption process.

6. The first server according to claim 1, comprising:
information storing means for preliminarily storing authentication information corresponding to the communication terminal; and
authentication processing means for performing authentication of a user of the specific communication terminal with reference to the authentication information stored in the information storing means, based on authentication information transmitted from the specific communication terminal.

7. A first server capable of providing a communication processing service with a second server, to a communication terminal belonging to a network capable of identifying equipment bodies of respective subordinate communication terminals, the first server comprising:
a communication interface configured to receive first communication terminal-specific information to specify a specific communication terminal having acquired service-specific information specifying the communication processing service, and the acquired service-specific information in association with each other;
a processor configured to generate second communication terminal-specific information for letting the second server recognize the specific communication terminal, based on the received first communication terminal-specific information;
the processor configured to generate approval request information containing the service-specific information and the second communication terminal-specific information and control transmission of the approval request information to the second server;
the communication interface configured to receive approval result information containing the service-specific information and the second communication terminal-specific information, returned from the second server in accordance with transmission of the approval request information; and
the processor configured to determine that reception of the communication processing service by the specific communication terminal was approved, according to reception of the approval result information, and for providing the communication processing service to the specific communication terminal, wherein
the approval request information contains encrypted information obtained by encrypting information containing at least the service-specific information and the second communication terminal-specific information, and plaintext information in a state in which the service-specific information and the second communication terminal-specific information is not encrypted,
the approval result information also contains the encrypted information and the plaintext information, and
the processor is configured to encrypt the plaintext information contained in the approval result information, compare the encrypted result with the received encrypted information to determine whether the approval request information corresponds to the approval result information, and perform the registration process when the approval request information corresponds to the approval result information.

8. The first server according to claim 7, wherein the network is a mobile communication network, and the first communication terminal-specific information is a phone number of the specific communication terminal in the mobile communication network.

9. The first server according to claim 8, wherein the second communication terminal-specific information is information different from the first communication terminal-specific information.

10. The first server according to claim 7, wherein the encrypted information is information encrypted while containing private information except for the service-specific information and the second communication terminal-specific information, and the plaintext information does not contain the private information.

11. The first server according to claim 7, wherein the encrypted information is information encrypted while containing information not overlapping with respect to the second communication terminal-specific information in each encryption process.

12. The first server according to claim 7, comprising:
a memory configured to preliminarily store authentication information corresponding to the communication terminal; and
the processor configured to perform authentication of a user of the specific communication terminal with reference to the authentication information stored in the memory based on authentication information transmitted from the specific communication terminal.

* * * * *